US010664636B2

(12) United States Patent
Hodge et al.

(10) Patent No.: US 10,664,636 B2
(45) Date of Patent: May 26, 2020

(54) PIN NUMBER DEFINITION BASED ANALYTICS

(71) Applicant: International Business Machines Corporation, Armonk, NY (US)

(72) Inventors: Damon G. Hodge, Pflugerville, TX (US); Jesus Montanez, Austin, TX (US); Si T. Win, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 15/848,945

(22) Filed: Dec. 20, 2017

(65) Prior Publication Data

US 2019/0188348 A1 Jun. 20, 2019

(51) Int. Cl.
*G06F 30/30* (2020.01)
*G06F 30/33* (2020.01)
*G06F 30/39* (2020.01)
*G06F 30/398* (2020.01)

(52) U.S. Cl.
CPC ............ *G06F 30/30* (2020.01); *G06F 30/33* (2020.01); *G06F 30/39* (2020.01); *G06F 30/398* (2020.01); *G06F 2213/0024* (2013.01)

(58) Field of Classification Search
CPC ...... G06F 3/0418; G06F 16/35; G06F 17/243; G06F 9/455; G06F 17/5045; G06F 17/5022; G06F 17/5068; G06F 2213/0024; G06F 30/30; G06F 30/33; G06F 30/39; G06F 30/398
See application file for complete search history.

(56) References Cited

U.S. PATENT DOCUMENTS

| | | | | |
|---|---|---|---|---|
| 5,726,918 A | * | 3/1998 | Giramma | G06F 17/5022 703/14 |
| 5,745,124 A | * | 4/1998 | Parks | G06F 17/5068 345/441 |
| 5,838,579 A | * | 11/1998 | Olson | G06F 17/5022 716/109 |
| 5,838,593 A | * | 11/1998 | Komatsu | G06F 11/261 703/15 |
| 5,920,490 A | * | 7/1999 | Peters | G01R 31/318342 714/744 |
| 6,058,252 A | * | 5/2000 | Noll | G06F 17/5031 716/113 |
| 6,154,388 A | * | 11/2000 | Oh | G11C 5/005 365/185.04 |
| 6,459,175 B1 | * | 10/2002 | Potega | G01R 31/36 307/149 |
| 6,678,873 B1 | * | 1/2004 | Kohashi | G06F 17/5045 716/102 |
| 7,168,041 B1 | * | 1/2007 | Durrill | G06F 17/5022 715/210 |

(Continued)

FOREIGN PATENT DOCUMENTS

JP 2001325315 A 11/2001

*Primary Examiner* — Helen Rossoshek
(74) *Attorney, Agent, or Firm* — Patterson + Sheridan, LLP

(57) ABSTRACT

Method and apparatus for analyzing an electrical circuit design includes storing within a memory associated with a pin, a pin functional definition comprising a pin connection parameter, and comparing the pin connection parameter to a design parameter to determine a result pertaining to a pin connection. The memory may be internal or external to the pin.

20 Claims, 6 Drawing Sheets

(56) References Cited

U.S. PATENT DOCUMENTS

| | | | | |
|---|---|---|---|---|
| 7,290,238 B2* | 10/2007 | Stauffer | ................ | G06F 17/505 716/102 |
| 7,340,700 B2* | 3/2008 | Emerson | .......... | G01R 31/31704 716/111 |
| 7,398,500 B1 | 7/2008 | Gupta et al. | | |
| 8,201,136 B2* | 6/2012 | Kumagai | ............ | G06F 17/5068 716/139 |
| 8,327,303 B1* | 12/2012 | Foster | ................ | G06F 17/5036 716/106 |
| 8,347,256 B2* | 1/2013 | Kunimoto | ........... | G06F 17/5045 716/118 |
| 8,479,130 B1* | 7/2013 | Zhang | ................ | G06F 17/5045 716/106 |
| 8,510,698 B2* | 8/2013 | Kumagai | ........... | G06F 17/5045 716/119 |
| 8,645,896 B1* | 2/2014 | Suri | ................... | G06F 17/5081 716/136 |
| 8,650,515 B2* | 2/2014 | Alam | ................. | G06F 17/5045 716/100 |
| 8,661,401 B1* | 2/2014 | Ogami | ................ | G06F 17/5068 716/100 |
| 8,762,913 B2* | 6/2014 | Orita | ................... | G06F 17/5068 716/111 |
| 9,064,063 B1* | 6/2015 | Yu | .......................... | G06F 17/50 |
| 2002/0052729 A1* | 5/2002 | Kyung | ................ | G06F 17/5022 703/28 |
| 2003/0167161 A1 | 9/2003 | Katz et al. | | |
| 2004/0139409 A1* | 7/2004 | Nagasawa | ........... | G06F 17/5045 716/103 |
| 2005/0036397 A1* | 2/2005 | Yeh | ......................... | G06F 3/061 365/232 |
| 2008/0140323 A1* | 6/2008 | Kumagai | ........... | G06F 17/5045 702/57 |
| 2013/0245854 A1* | 9/2013 | Rinne | ...................... | G06F 1/26 700/297 |
| 2014/0137058 A1 | 5/2014 | Alam et al. | | |
| 2015/0199088 A1* | 7/2015 | Chandaria | ............ | G06F 3/0482 715/763 |
| 2017/0011138 A1* | 1/2017 | Venkatesh | ............ | G06F 17/505 |

* cited by examiner

| IC | Pin | Port | Function | Bit | Phase | TX/RX | Net Name | TX/RX | Phase | Bit | Function | Port | Pin | IC |
|---|---|---|---|---|---|---|---|---|---|---|---|---|---|---|
| CPI | AJ43 | A0 | Data | 0 | P | T | NA_CP0A0_P_CP1A0_CK0_DAT_22_N | T | N | 22 | Data | A0 | L45 | CP0 |
| CPI | AK43 | A0 | Data | 0 | N | R | NA_CP0A0_P_CP1A0_CK0_DAT_22_N | T | P | 22 | Data | A0 | K45 | CP0 |
| CPI | AF43 | A0 | Data | 1 | P | R | NA_CP0A0_P_CP1A0_CK0_DAT_21_N | T | N | 21 | Data | A1 | M45 | CP0 |
| CPI | AG43 | A0 | Data | 1 | N | R | NA_CP0A0_P_CP1A0_CK0_DAT_21_N | T | P | 21 | Data | A0 | N45 | CP0 |
| CPI | AL43 | A0 | Data | 2 | P | R | NA_CP0A0_P_CP1A0_CK0_DAT_20_N | T | N | 20 | Clock | A0 | H45 | CPI |
| CPI | AM43 | A0 | Data | 2 | N | R | NA_CP0A0_P_CP1A0_CK0_DAT_20_N | T | P | 20 | Data | A0 | J45 | CP0 |
| CPI | AH44 | A0 | Data | 3 | P | R | NA_CP0A0_P_CP1A0_CK0_DAT_19_N | T | N | 19 | Data | A0 | L46 | CP0 |

FIG. 4

PIN NUMBER DEFINITION BASED ANALYTICS

BACKGROUND

The present invention relates to electronic components, and more specifically, to generating and validating integrated circuit board designs.

Electronic components, such as processors, memory buffers, peripheral component interconnect express (PCIe) switches and other (integrated circuits) ICs can each have thousands of pins. Pin-compatible electronic components may share a common footprint and have the same functions assigned or usable on the same pins. Pin compatibility is a property desired by system integrators as it allows a product to be updated without redesigning printed circuit boards, which can reduce costs and decrease time to market. To integrate within a server design, each of these pins requires multiple logical and physical processes implemented throughout the printed circuit board (PCB) development process.

SUMMARY

According to one embodiment of the present invention, a method of analyzing an electrical circuit design includes storing within a memory associated with a pin, a pin functional definition comprising a pin connection parameter, and comparing the pin connection parameter to a design parameter to determine a result pertaining to a pin connection.

According to another particular embodiment, a system includes a pin and a memory storing a pin connection parameter associated with the pin. A processor may be configured to access the memory and to execute program code to compare the pin connection parameter to determine a result pertaining to a pin connection.

According to another embodiment, a computer program product for analyzing an electrical circuit, the computer program product including a computer-readable storage medium having computer-readable program code embodied therewith, the computer-readable program code executable by one or more computer processors to store within a memory associated with a pin, a pin functional definition including a pin connection parameter, and compare the pin connection parameter to determine a result pertaining to a pin connection.

BRIEF DESCRIPTION OF THE SEVERAL VIEWS OF THE DRAWINGS

FIG. 4 illustrates a database table that includes information pertaining to parameters for a number of integrated circuits under analysis;

DETAILED DESCRIPTION

Figure 1:
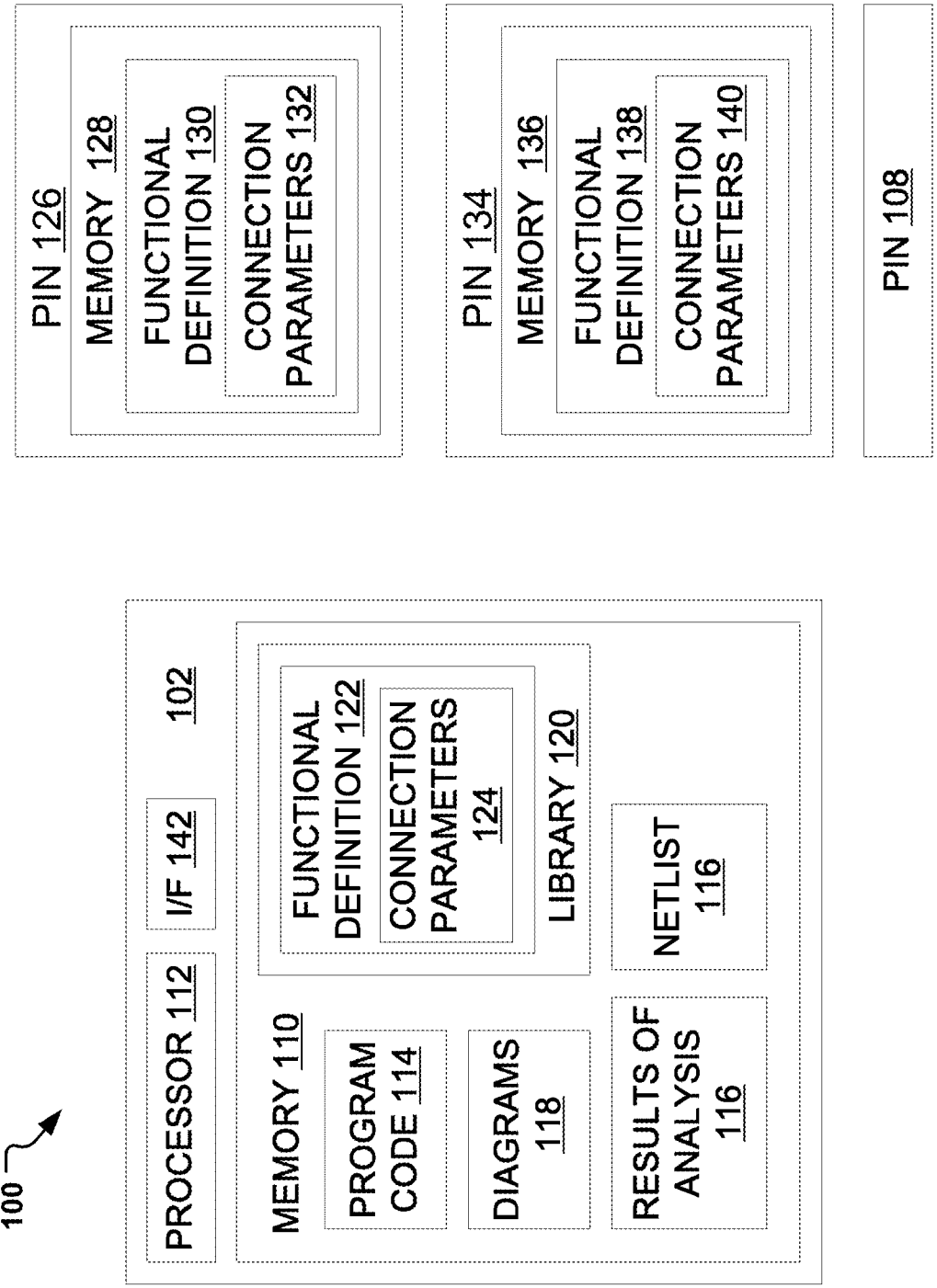
FIG. 1 is a block diagram of an embodiment of a system configured to use pin definitions to perform PCB validation and design processes.

An embodiment of a system uses a pin functional definition that enables different logical, electrical, and physical parameters to be verified in printed circuit board designs. An implementation embeds the critical logical, electrical and physical parameters within the pin functional definition. The pin definition may be embedded within an overall logical and physical symbol definition (e.g., internal to the pin) or stored within an external library. This data may be referenced and compared against a design under analysis. With this data, different logical, physical and electrical validation and analysis may be performed.

An embodiment of a system uses pin numbers' functional definitions and their implementation to perform systematic computational analysis. This analysis may result in the data necessary to perform multiple different logical and physical processes. As discussed herein, the pin numbers' functional definitions may be implemented through an independent library. Alternatively, the pin numbers' functional definitions may be embedded within the components' logical and physical symbols' definition within a memory of the pin, itself. Electrical, physical, and logical net parameters may be stored in the pin number definitions. These parameters may include, but are not limited to: 1) bus type (e.g., chip proprietary: IBM and Industry Standard: double data rate (DDR), peripheral component interconnect express (PCIe), universal serial port (USB), 2) port number (e.g., a 4×1 PCIe switch device), 3) port byte, nibble, and bit number, 4) net type (e.g., data transmit, data receive, clock, power, ground), 5) differential pair polarity assignment scheme, and 6) pin number.

Using this data, analysis may be performed and any number of different tasks. For instance, an embodiment of a system utilizes the pin number definition data to validate the logical connections between components in a printed circuit board's (PCB's) schematics. Once component is identified, the components' pin number functional definition data is referenced: 1) bus type 2) port number, 3) port byte, nibble, and bit number, 4) net type, 5) differential pair polarity assignment scheme, and 6) pin number. The pin number definitions may also include information regarding external component requirements for particular bus types' specifications, such as PCIe blocking cap requirements. The system may use this information to analyze the data and validate the legality of the logical connection for each component pin.

An embodiment of the system utilizes pin number definition data to generate wiring constraints of net trace connections in a PCB's layout. Once component is identified, the components' pin number definitions are referenced. With this information, the embodiment analyzes the data and generates the physical constraints for each signal pin on each major IC. The resulting constraints may include, but are not limited to: 1) line and gap width and tolerance allowance, 2) net bus/group generation, 3) inter-differential pair, adjacent net and group spacing Inter-differential pair, 4) adjacent net and group spacing, 5) skew, neckdown and overall length, and 6) line spacing to other geometrical and logical elements, such as specific nets or types, shapes, vias, and pins.

An embodiment of the system uses the pin number definition data to verify a physical implementation of net etch traces in a PCB's layout. Once a component is identified, the components' pin number definitions are referenced. With this information, the system may analyze the data and the current layout for violations compared to a reference definition. The resulting constraints may include, but are not limited to: 1) wiring escape angle, length and trace width used, 2) via padstack geometries used, 3) total lengths and neckdown lengths used, 4) number and length of stubs, and 5) orthogonal wiring lengths.

Another embodiment of a method utilizes pin number definition data to evaluate a net trace attenuation in a PCB's layout. Once a component is identified, the components' pin number definitions are referenced. With this information, the system may analyze the pin functional definition, along with the current physical layout. They system may then compute the total physical end-to-end signal attenuation loss. The resulting constraints may include, but are not limited to net attenuation loss estimates at different frequencies.

Another embodiment of a method relates to schematic entry and logic generation. The method may utilize the pin number definition data to generate logical connections in a PCB's schematics. Once the components are identified, the components' pin number definitions are referenced and functional data is sourced. Such function data may include: 1) bus type 2) port number, 3) port byte, nibble, and bit number, 4) net type, 5) differential pair polarity assignment scheme, and 6) pin number. The pin number definitions may also include information on the various bus types' associated specifications, such as a PCIe connector's pin diagrams. With this information, the embodiment of the method analyzes the data and generates the connection between respective pins of each component for each pin on each major IC. Rather than validating the legality of each pin's logical connection after they are manually entered, as discussed herein, an embodiment may generate those connections.

FIG. 1 is a block diagram of an embodiment of a system 100 configured to use pin definitions to perform PCB validation and design processes. The system 100, or apparatus, may include a computing device 102 in communication with one or more pins 104, 106, 108. The computing device 102 may include a memory 110 and a processor 112 having access to the memory 110. As shown, the memory 110 may include program code 114, a netlist 116, and circuit diagrams 118. The memory 110 may further include a library 120, or database, storing a functional definition 122 that includes connection parameters 124 associated with the pin 108. The computing device may also include an interface (I/F) 142 with which to communicate with other devices.

The pin 126 may include a memory 128 having a functional definition 130. The functional definition 130 may be associated with the pin 126 and may include connection parameters 132. Similarly, the pin 134 may include a memory 136 having a functional definition 138. The functional definition 138 may be associated with the pin 134 and may include connection parameters 140.

Figure 2:
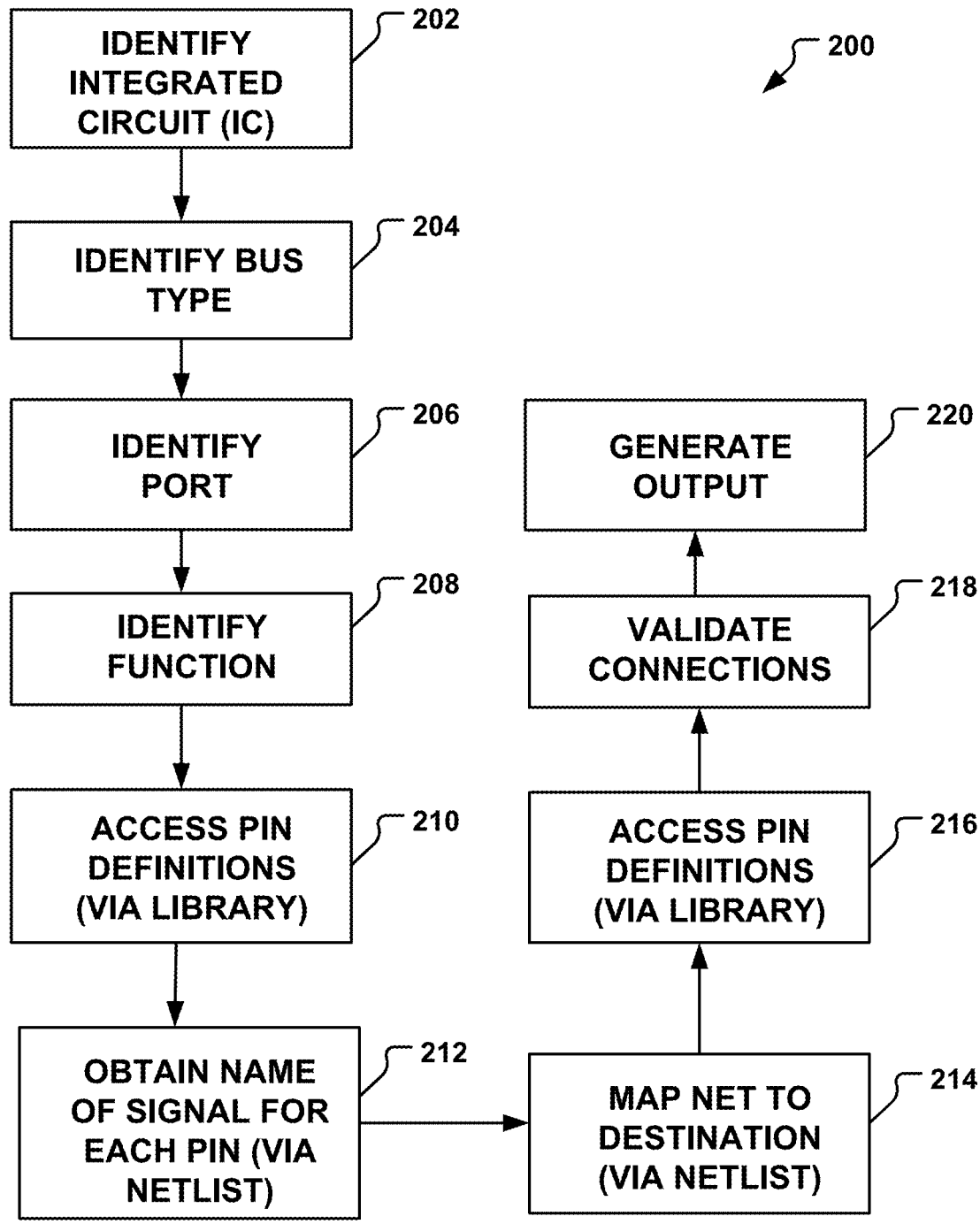
FIG. 2 is flowchart of a method consistent with an embodiment to perform computational analysis, including logical verification.

FIG. 2 is flowchart of a method 200 consistent with an embodiment to perform computational analysis, including logical verification. At 202, the system may prompt a user to identify an integrated circuit (IC). The user may be prompted to identify a bus type at 204. Similarly, the user may identify a port at 206 and a function at 208.

Figure 3:
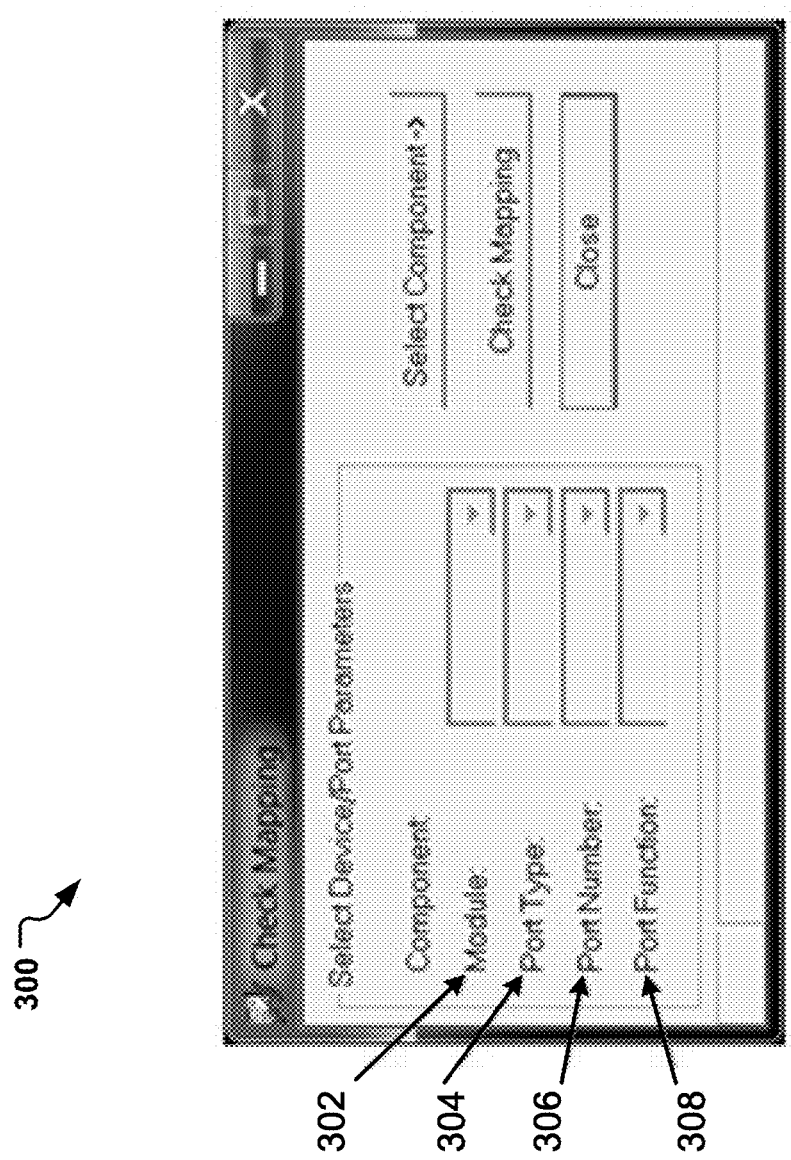
FIG. 3 shows an illustrative input window via which the system may prompt information from the user, such as in the method of FIG. 2.

FIG. 3 shows an illustrative input window 300 via which the system may prompt information from the user, such as in the method 200 of FIG. 2. For instance, a user may use a pulldown menu 302 to identify a module. Another pulldown menu 304 may allow the user to identify a port or bus type. The pulldown menu may update automatically based on the module selected at 302. A user may select a port number from the pulldown menu 306. The user may further use the window to isolate particular ports. The port function may be identified by the user at 308. The user may isolate particular functions (e.g., data).

Returning to the flowchart of FIG. 2, the system may access pin definitions at 210. For instance, the system may access a library or a memory of the pin, itself, to retrieve the pin information.

FIG. 4 illustrates a database table 400 that includes information pertaining to parameters for a number of integrated circuits under analysis. Such a database may reside in a library or internal to the pin. The table 400 includes a column 402 listing integrated circuits under analysis. Other columns correspond to pin number definition information that is accessed and read, such as in 210 of FIG. 2. The pin number definitions may include: pin 404, port 406, function 408, bit 410, phase 412, and transmit/receive (TX/RX) 414.

Returning to the embodiment of the method 200 of FIG. 2, the system may access a netlist to obtain a name of a signal connected to each pin at 212. To illustrate, the table 400 of FIG. 4 includes a column 416 that includes net names. The system may use a netlist to identify the signal names. The system is not dependent on net names or net naming conventions. This independence is because the system obtains the net names from the netlist using their pin numbers, and the pin numbers do not change for a given IC.

Returning to the embodiment of the method 200 of FIG. 2, the system may access the netlist to map each net to a destination IC at 214. With the netlist, the destination IC and pin number may be determined at 216. As before, the system may access the library at 216 to retrieve the destination IC's pin definitions.

Columns 418, 420, 422, 424, 426 correspond respectively to the TX/RX, phase, bit, function, and port information retrieved from the destination IC's pin definition. Such information may be retrieved at 220 of the embodiment of the method 200 of FIG. 2. Columns 428 and 430 list destination pin numbers and IC's, respectively.

At 218 of FIG. 2, the system may validate connections. For example, the system may use the database, including the table information 400 of FIG. 4, to identify illegal connections. The system may generate an output at 220.

The table 400 includes bus connection discontinuities, such as may be determined at 218 of FIG. 2. For example, the port value, "A0," at 432 of an IC 434 may not match the port value, "A1," at 436 of the destination IC 438. Additionally, the IC, "CP1," at 440 may be inaccurately indicated to have itself as the destination IC, "CP1," at 442.

The table 400 additionally reveals net type discontinuities, such as may be determined at 224 of FIG. 2. For example, the function value, "Data," at 444 of an IC 440 may not match the function value, "Clock," at 446 of the destination IC 442. Illegal lane swapping could similarly be detected using the bit columns 410, 422. In the case of FIG. 4, there are no illegal lane swaps. Different signal polarity may be verified by comparing the phase columns 412, 420. Because the corresponding polarities are opposites, the P and N values are legal swaps. As is also shown in FIG. 4, and more particularly in columns 414, 418, the transmit-to-receive values 448, 450 of IC 4xx and IC 4xx are illegal (e.g., both are transmitting). The transmit-to-receive values 452, 454 of IC 456 and IC 458 are likewise illegal (e.g., both cannot be receiving).

Figure 5:
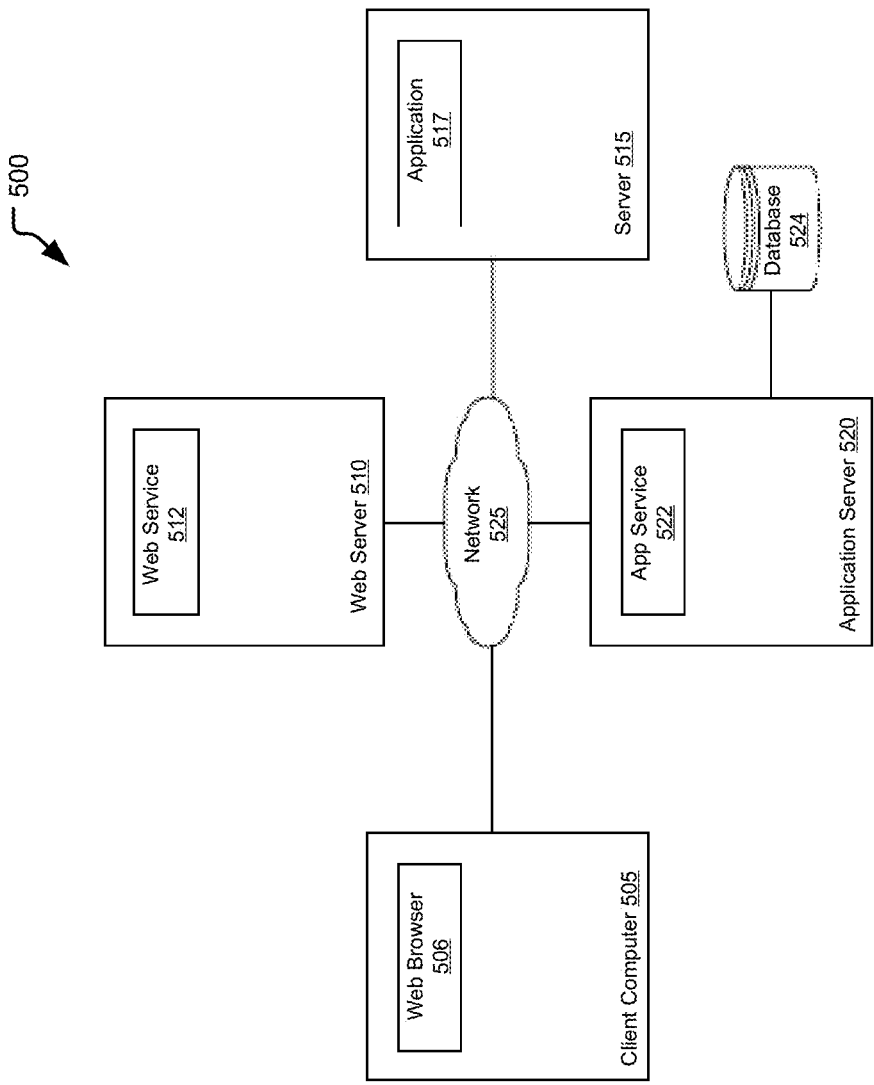
FIG. 5 illustrates an example computing environment according to one embodiment.

FIG. 5 illustrates an example computing environment 500 according to one embodiment. As shown, the computing environment 500 includes a client computer 505, a web server 510, a server 515, and an application server 520. The client computer 505 may be a physical system (e.g., a desktop, laptop computer, mobile device, etc.) or a virtual computing instance executing in the cloud. The client computer 505 includes a web browser 506. A user may access data services through the web browser 506 over a network 525 (e.g., the Internet).

For instance, a user may access a web service 512 executing on a web server 510. In one embodiment, the web service 512 provides a web interface for an application server 520 (e.g., executing an application service 522). More specifically, the application service 522 provides a database 524.

Figure 6:
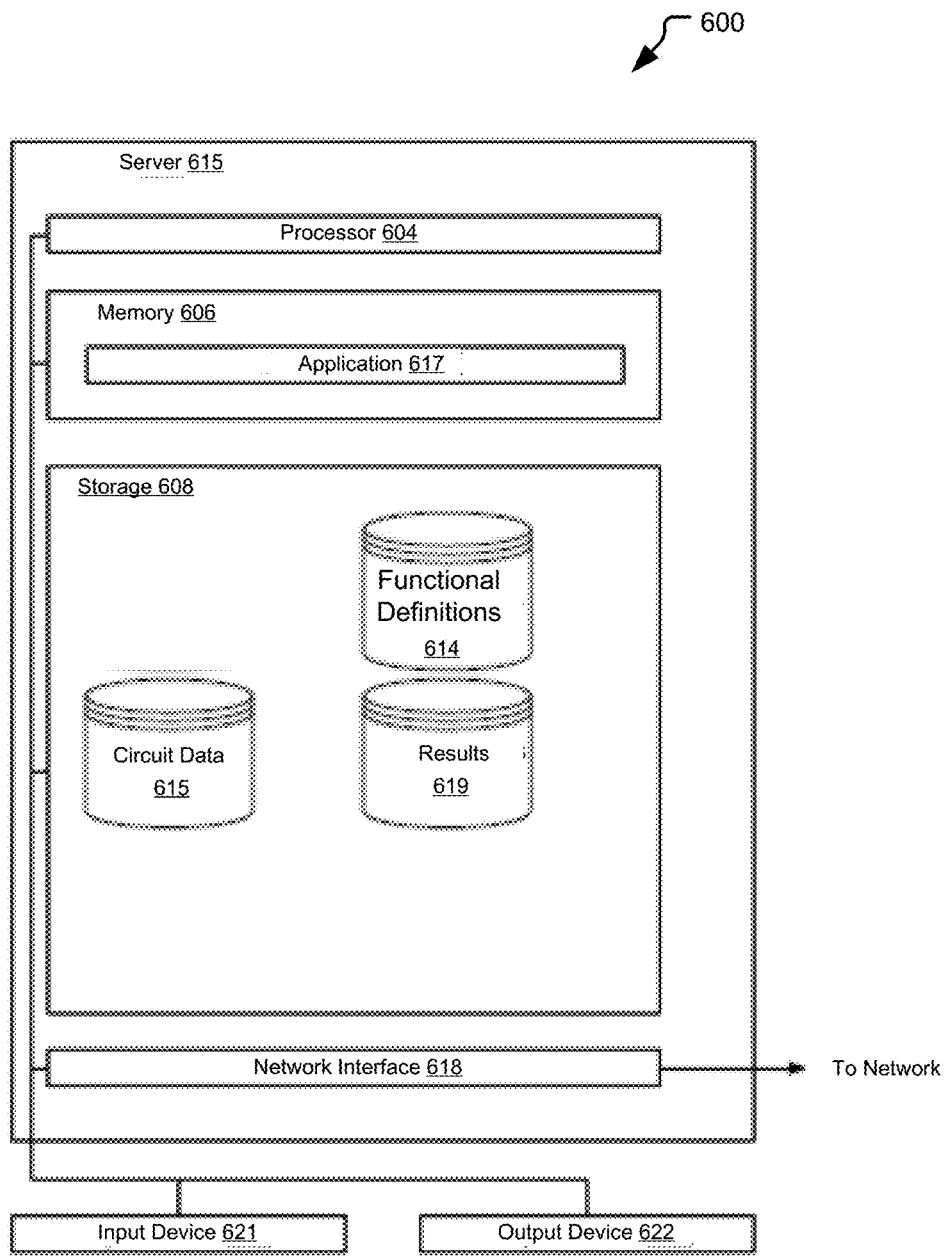
FIG. 6 further illustrates a server of FIG. 5, according to one embodiment.

FIG. 6 further illustrates the server 515, according to one embodiment. The server 515 generally includes a processor 604 connected via a bus to a memory 606, a network interface device 618, a storage 608, an input device 621, and an output device 622. The server 515 is generally under the control of an operating system. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is included to be representative of a single CPU, multiple CPUs, a single CPU having multiple processing cores, and the like. Similarly, the memory 606 may be a random access memory. While the memory 606 is shown as a single identity, it should be understood that the memory 606 may comprise a plurality of modules, and that the memory 606 may exist at multiple levels, from high speed registers and caches to lower speed but larger DRAM chips. The network interface device 618 may be any type of network communications device allowing the navigation server 510 to communicate with other computers via the network 525.

The storage 608 may be a persistent storage device. Although the storage 608 is shown as a single unit, the storage 608 may be a combination of fixed and/or removable storage devices, such as fixed disc drives, solid state drives, removable memory cards, optical storage and network storage systems.

As shown, the memory 606 contains the application 617, which is an application generally executed to take actions described herein. Storage 608 contains functional definitions 614, circuit data 615, and results 619.

The input device 622 may provide a keyboard and/or a mouse, etc. The output device 622 may be any conventional display screen. Although shown separately from the input device 621, the output device 622 and input device 621 may be combined. For example, a display screen with an integrated touch-screen may be used.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of analyzing an electrical circuit design, the method comprising:
   storing within a memory located internal to a pin, a pin functional definition comprising a pin connection parameter; and
   comparing the pin connection parameter to a design parameter to determine a result pertaining to a pin connection.

2. The method of claim 1, wherein the memory is stored internal to the pin.

3. The method of claim 1, wherein the pin connection parameter includes at least one of: a bus type, a port number, a port byte, a nibble, a bit number, a net type, a pair polarity assignment scheme, a pin number, and peripheral component interconnect express (PCIe) blocking cap information.

4. The method of claim 1, wherein determining the result further includes validating the pin connection.

5. The method of claim 1, wherein determining the result further includes generating a wiring constraint of a net trace connection.

6. The method of claim 5, wherein the wiring constraint is at least one of: a line width, a gap width, a tolerance allowance, a net bus generation, an inter-differential pair, an adjacent net and group spacing Inter-differential pair, an adjacent net and group spacing, a skew, a neckdown and overall length, and a line spacing.

7. The method of claim 1, wherein determining the result further includes verifying a physical implementation of net etch traces.

8. The method of claim 1, wherein the pin connection parameter includes at least one of: a wiring escape angle, length and trace width used, a padstack geometry, a total length, a neckdown length, a number and length of a stub, and an orthogonal wiring length.

9. The method of claim 1, wherein determining the result further includes generating a logical connection.

10. The method of claim 1, wherein determining the result is does not require a net name.

11. The method of claim 1, wherein determining the result further includes determining an attenuation loss.

12. A system, comprising:
    a pin;

a memory storing a pin connection parameter associated with the pin, wherein the memory is located internal to the pin; and a processor configured to access the memory and to execute program code to compare the pin connection parameter to a design parameter to determine a result pertaining to a pin connection.

13. The system of claim 12, wherein the pin connection parameter includes at least one of: a bus type, a port number, a port byte, a nibble, a bit number, a net type, a pair polarity assignment scheme, a pin number, and peripheral component interconnect express (PCIe) blocking cap information.

14. The system of claim 12, wherein determining the result further includes at least one of: validating the pin connection, generating a wiring constraint of a net trace connection, and verifying a physical implementation of net etch traces.

15. The system of claim 12, wherein determining the result further includes at least one of: determining the result further includes generating a logical connection, and determining an attenuation loss.

16. A computer program product for analyzing an electrical circuit, the computer program product comprising:

a computer-readable storage medium having computer-readable program code embodied therewith, the computer-readable program code executable by one or more computer processors to:

store a pin functional definition comprising a pin connection parameter within a memory, wherein the memory is internal to the pin; and compare the pin connection parameter to a design parameter to determine a result pertaining to a pin connection.

17. The computer program product of claim 16, wherein the pin connection parameter includes at least one of: a bus type, a port number, a port byte, a nibble, a bit number, a net type, a pair polarity assignment scheme, a pin number, and peripheral component interconnect express (PCIe) blocking cap information.

18. The computer program product of claim 16, wherein determining the result further includes at least one of: validating the pin connection, generating a wiring constraint of a net trace connection, and verifying a physical implementation of net etch traces.

19. The computer program product of claim 16, wherein determining the result further includes at least one of: determining the result further includes generating a logical connection, and determining an attenuation loss.

20. The computer program product of claim 16, wherein determining the result further includes generating a logical connection.

* * * * *